United States Patent Office 2,700,049
Patented Jan. 18, 1955

2,700,049

EXTRACTION OF OXYGEN-CONTAINING COMPOUNDS FROM REACTION MIXTURES CONTAINING THE SAME

Walter Rottig, Oberhausen-Sterkrade-Nord, Germany

No Drawing. Application October 24, 1950,
Serial No. 191,944

Claims priority, application France August 20, 1948

3 Claims. (Cl. 260—450)

This application is a continuation-in-part of my copending application for patent Serial No. 109,226 filed August 8, 1949 which has now become United States Patent No. 2,581,712.

The invention relates to the extraction of oxygenated compounds from their mixtures with hydrocarbons.

The invention relates more particularly to the extraction of oxygen-containing compounds from reaction mixtures containing the same in admixture with aliphatic hydrocarbons such as result, for example, in the catalytic hydrogenation of carbon monoxide.

It is known that oxygen-containing compounds such as alcohols, esters, aldehydes, ketones and acids are formed in particularly large quantities if the hydrogenation reaction is carried out in the presence of an iron catalyst. Also in other chemical processes, for instance in the process of an additive combination of water gas with unsaturated hydrocarbons or in the process of oxidation of paraffin, mixtures of hydrocarbons with oxygenated compounds are obtained. Similar mixtures of different origin also contain a considerable percentage of oxygenated compounds, some of which are valuable and all of which have to be removed from the hydrocarbon mixtures formed in the hydrogenation of carbon monoxide in order to render these hydrocarbons fit for certain uses.

I have now found that it is possible to selectively extract in a simple manner and with a fair yield the oxygenated compounds from their mixtures with aliphatic hydrocarbons, and more especially from mixtures formed in the hydrogenation of carbon monoxide in the presence of iron catalysts, by using as extraction agents aromatic nitro compounds, aromatic amino compounds, or substituted derivatives of such compounds. Aniline and nitro benzene have been found to be particularly useful extraction agents.

I have further found that the selective extraction capacity of such aromatic nitro or amino compounds is considerably increased by the presence of a low-molecular alcohol, for example methyl alcohol or ethyl alcohol.

In practicing this invention, I may e. g. proceed as follows:

*Example 1.*—Into a four-stage extraction column, each stage of which had a volume of 800 cc. and contained 600 cc. aniline and Raschig rings 5 mm. in diameter, there were introduced hourly 150 cc. of a fraction, boiling between 200° and 320° C. of a carbon monoxide hydrogenation product containing 37% of alcohols. The hydrocarbon fraction was introduced near the lower bottom of each extraction stage through a distributing plate or tray. Owing to its lower specific weight the hydrocarbon rose in the aniline filling each stage and was exhausted above the liquid level by means of an overflow to run into the stage next following. The hydrocarbon mixture escaping from the last stage still contained about 4.5% alcohols. Extraction amounted to more than 92%.

If instead of pure aniline a mixture of 90% aniline and 10% methanol was used for extraction, the hydrocarbon mixture escaping from the last stage contained only 2% alcohols, equal to an extraction of 96%.

*Example 2.*—Through an extraction column of the kind described with reference to Example 1, 150 cc. of the same hydrocarbon fraction used in that example were passed in countercurrent to 650 cc. nitrobenzene. An 88% extraction of alcohols was obtained.

If 12% methyl alcohol were admixed with the nitrobenzene, extraction of alcohols, carried through under the same conditions as before, reached 94%.

Various changes may be made in the process hereabove described without departing from the invention or sacrificing the advantages thereof.

I claim:

1. A process for the extraction of oxygen-containing compounds from reaction mixtures containing said oxygen-containing compounds and hydrocarbons, which comprises treating said reaction mixture with a solvent which is liquid under the conditions prevailing during the process, said solvent comprising a major proportion of a member of the group consisting of aromatic nitro compounds and aromatic amino compounds, and a minor proportion of a low molecular weight monovalent alcohol.

2. The process of claim 1, wherein the solvent comprises a major proportion of aniline and a minor proportion of methyl alcohol.

3. The process of claim 1, wherein the solvent comprises 90% aniline and 10% methyl alcohol.

References Cited in the file of this patent

UNITED STATES PATENTS

| Number | Name | Date |
|---|---|---|
| 1,987,601 | Burke | May 26, 1937 |
| 2,127,325 | Clarke | Aug. 16, 1938 |
| 2,410,642 | Farkas et al. | Nov. 5, 1946 |
| 2,539,393 | Arnold et al. | Jan. 30, 1951 |
| 2,542,454 | Arnold et al. | Feb. 20, 1951 |
| 2,629,730 | Denton et al. | Feb. 24, 1953 |

FOREIGN PATENTS

| Number | Country | Date |
|---|---|---|
| 350,502 | Great Britain | June 15, 1931 |

OTHER REFERENCES

Lange, "Handbook of Chemistry," 6th ed. (1946), pages 358–359.